United States Patent [19]

Swearingen

[11] Patent Number: 4,582,327
[45] Date of Patent: Apr. 15, 1986

[54] DOUBLE FLUID POWER RECOVERY SYSTEM AND PROCESS THEREFOR

[76] Inventor: Judson S. Swearingen, 27403 Pacific Coast Hwy., Malibu, Calif. 90265

[21] Appl. No.: 431,708

[22] Filed: Sep. 30, 1982

[51] Int. Cl.[4] .............................................. F16J 15/40
[52] U.S. Cl. ...................................... 277/19; 60/655; 277/3
[58] Field of Search ......................... 60/657, 646, 655; 277/3, 27, 1

[56] References Cited

U.S. PATENT DOCUMENTS 3,919,854  11/1975  Denis ........................................ 277/3
4,189,156   2/1980  Geary ....................................... 277/3

Primary Examiner—Robert I. Smith
Attorney, Agent, or Firm—Lyon & Lyon

[57] ABSTRACT

A method and apparatus for power recovery from thermal input. A turbine is disclosed as employing two rotors for two gas cycles, one using a high boiling point fluid and the other using a low boiling point fluid such as steam and butane, respectively. Separation of the fluids is accomplished through mutual collection and selective withdrawal from accumulator tanks. Seals are also disclosed which employ both air and the higher boiling point fluid as a means for preventing the contamination of bearing lubricants by the low boiling point fluids.

19 Claims, 3 Drawing Figures

4,582,327

DOUBLE FLUID POWER RECOVERY SYSTEM AND PROCESS THEREFOR

BACKGROUND OF THE INVENTION

The field of the present invention is turbomachinery and particularly double fluid processes and systems. Conventionally, power recovery from a heat source has generally employed the heating of a working fluid, expansion of the resulting vapor through a turbine or other engine and condensation of the resulting expanded vapor for reheating. When high temperatures are available as the source of heat, particularly higher than 300° F., high boiling liquids such as benzene and toluene must be considered because a working fluid does not efficiently absorb heat at temperatures above its critical temperature, the temperature at which the fluid can no longer exist as a liquid. However, the use of such fluids is generally not advantageous because the condensing pressure at reasonable temperature levels is so low that the resulting vapor volume is excessive. Thus, the turbine must be large and expensive to accommodate such fluids.

To overcome the foregoing difficulties, it has been known to employ two fluids, namely mercury and water for the recovery of power from burning fuels. Such a system employs two cycles run at different temperatures with heat exchange used to condense the higher boiling point liquid and heat the lower boiling point liquid. However, economics were not found to encourage the use of the water-mercury system above the temperature of boiling pressurized water. Other fluids exhibit particular difficulties as far as sealing and contamination of bearing lubricants. Consequently, difficulties exist for both the single fluid system and previously proposed double fluid systems.

SUMMARY OF THE INVENTION

The present invention is directed to a practical two-fluid system for power recovery. To this end, one aspect of the present invention includes the employment of a single turbine having two rotors mounted on a common shaft. Such a system allows employment of such fluids as water for the high temperature cycle and butane for the low temperature cycle. The steam may be employed adjacent lubricated bearings while the hydrocarbon fuel such as butane may be isolated from such bearings by the steam. The butane or other hydrocarbon fluid is not able to contaminate the lubricant under such circumstances. Additionally, advantageous venting of seals can be accomplished into one or the other of the fluid accumulators. Due to the immiscibility of the fluids and the variation in specific gravity, later separation of the fluids is easily accomplished.

Such dual fluid systems may also be used advantageously according to another aspect of the present invention as a means for creating a highly efficient seal. The fluid of the two fluids which is less able to contaminate bearing lubricant may be injected in a high pressure state into a seal between the bearing to be protected and the rotor for the second fluid. In the case of water and butane, water will not mix with the lubricant while butane will contaminate most lubricants. Consequently, high pressure steam may be injected into a seal between a butane rotor in a turbine and the bearings to be protected. When a rotor for each of the fluids is provided on the same shaft of a turbine, the steam or other fluid compatible with bearing lubricant is conveniently used to isolate the less compatible fluid from the bearings.

Accordingly, it is an object of the present invention to provide an improved system, including both method and apparatus for the recovery of power using fluids of different boiling points. Other and further objects and advantages will appear hereinafter.

DETAILED DESCRIPTION OF THE PREFERRED EMBODIMENT

Figure 1:
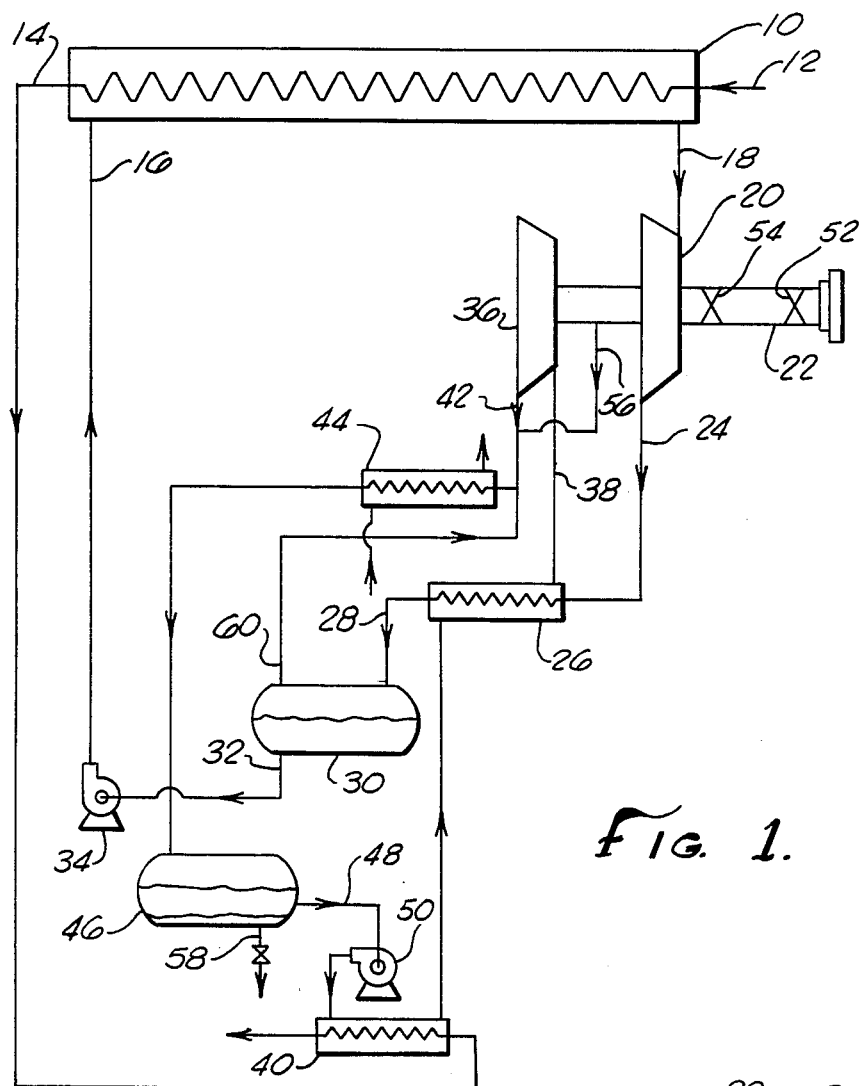
FIG. 1 is a schematic of a system of the present invention.

Turning in detail to the drawings, FIG. 1 illustrates a double fluid system for the recovery of power from a source of heat. To this end, a heat exchanger 10 is illustrated as a source of heat for the system. A boiler or the like may also be employed as the source of heat. The heat exchanger 10 includes tube side flow of a heated fluid entering at an inlet 12 and exiting at an outlet 14. The fluid to be passed through the turbine passes as shell side counter-current flow through the heat exchanger 10 by entering at an inlet 16 and exiting at an outlet 18. Thus, substantial thermal energy is imparted to the working fluid by the time it exits the heat exchanger 10 through the outlet 18.

The outlet 18 also is shown schematically to extend as a fluid line representing an intake to a first turbine rotor 20. The fluid conveyed through the line 18 is allowed to expand in the turbine rotor 20 to generate power transmitted through the turbine shaft 22. An outlet 24 extends from the rotor 20 to a second heat exchanger 26. The heat exchanger 26 receives the expanded fluid from the rotor 20 as tube side flow to be cooled and then conveyed by means of a passage 28 to a first accumulator 30. The heat exchanger 26 is arranged in such a way that the flow through the passage 24 is cooled such that it can condense in the accumulator 30 and exit through a passageway 32 back through a pump 34 for recycling through the inlet 16 to the heat exchanger 10.

The fluid conveyed through the cycle just described, including the rotor 20, is contemplated to be water and is the higher boiling point liquid of the two fluids employed in this system.

A second rotor 36 is employed to recover additional thermal energy initially imparted to the system through the heat exchanger 10. To this end, influent to the second rotor 36 through a passage 38 is directed from the heat exchanger 26 after having been heated by the exhaust from the first turbine 24. Additionally, heating fluid exhausted through outlet 14 of the heat exchanger 10 is conveyed to a heat exchanger 40 to impart additional heat to the fluid directed to the second rotor 36.

To complete the cycle, the exhaust from the rotor 36 exits through an outlet 42, is condensed in a heat exchanger 44 and is collected in an accumulator 46. The accumulated fluid may then be pumped through an accumulator outlet 48 and a pump 50 to be reheated and expanded in the cycle.

In the present embodiment, butane is contemplated as the second fluid employed with the rotor 36. The butane fluid is maintained, after having passed through the rotor 36, under sufficient pressure such that it will condense after having passed through the heat exchanger 44 which is intended in this embodiment to be cooled by ambient air or liquid.

The turbomachinery schematically illustrated in the embodiment of FIG. 1 includes the shaft 22 upon which both the high temperature rotor 20 and the low temperature rotor 36 are mounted. Two bearings 52 and 54 are illustrated as mounting the shaft 22 such that the rotors 20 and 36 are supported in a cantilever arrangement. Such a device separates the bearings 52 and 54 from the rotor 36 containing, in this embodiment, the expanding butane gases. As will be discussed in greater detail below, this arrangement acts to avoid contamination of the bearing lubricant by the butane.

A seal between the high temperature rotor 20 and the low temperature rotor 36 is provided on the shaft 22. This device is schematically illustrated as a pressure vent 56. The pressure vent 56 exhausts to the outlet 42 of the rotor 36 where fluid from both rotors 20 and 36 can pass to the heat exchanger 44 and into the accumulator 46. It is contemplated that the fluids selected for the working fluids, such as water and butane, are immiscible. Further, the specific gravities of the fluids along with their immiscibility causes the fluids to become stratified in the accumulator 46. As a result, the heavier fluid may be withdrawn from the bottom of the accumulator through an outlet 58. This accumulated fluid may not only be collected through the vent 56 but may also be drawn into the rotor 36. In either case, the heavier fluid will be extracted in the accumulator 46.

As the lighter fluid principally conducted through the rotor 36 may also find its way into the rotor 20 under some circumstances or may otherwise contaminate the heavier fluid system through leaks or the like, a gas outlet 60 is provided at the top of the accumulator 30. As the higher temperature fluid contained within the accumulator 30 is likely to be above the boiling point of the low temperature fluid, all of the immiscible fluid will be driven off through the outlet 60 and back into the low temperature fluid cycle through the heat exchanger 44.

Figure 2:
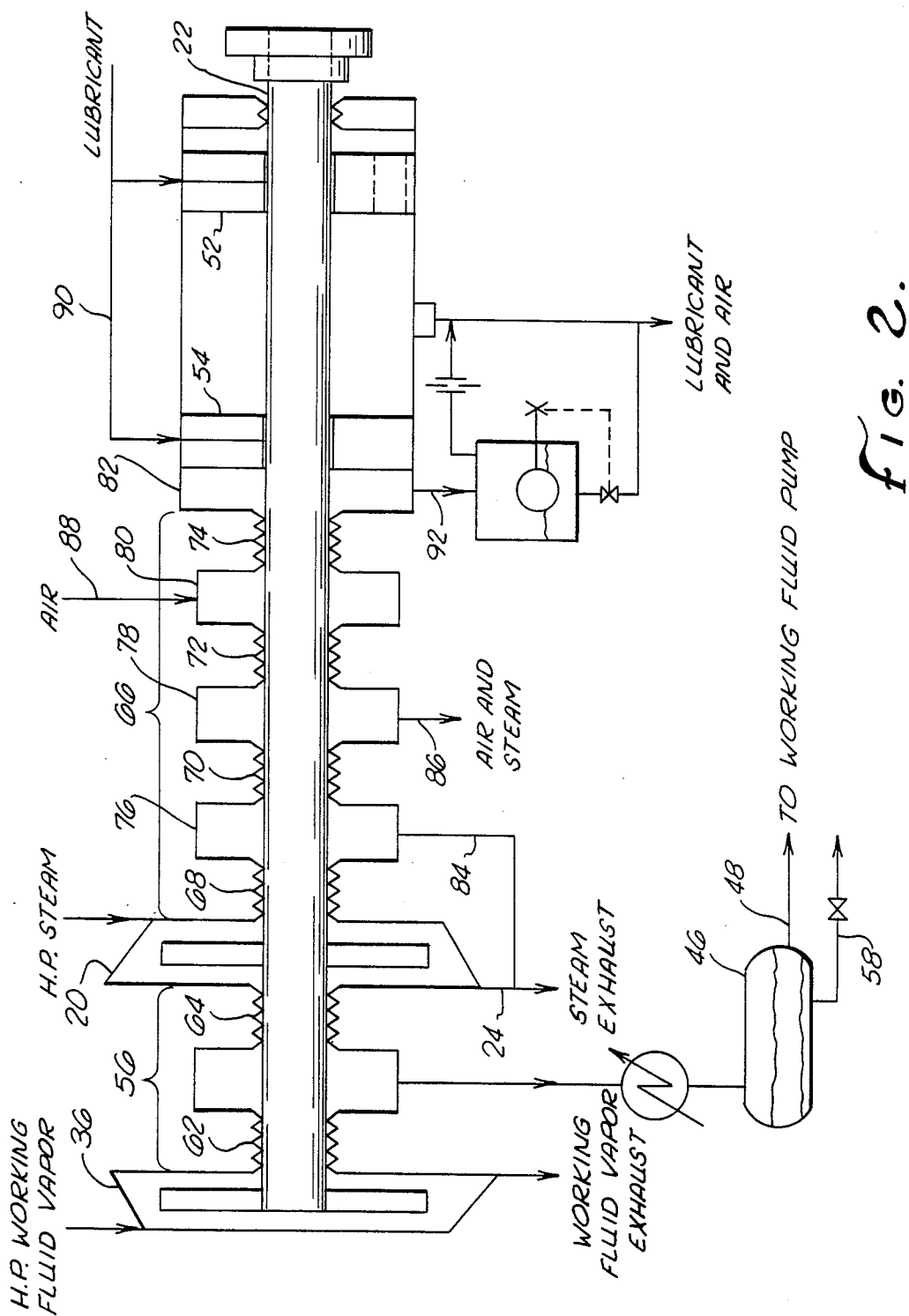
FIG. 2 is a detail schematic of the bearings, seals and rotors of the system of FIG. 1.

Looking in greater detail to the seal mechanisms of the embodiment of FIGS. 1 and 2, the seal 56 between the rotors 20 and 36 is illustrated as including two labyrinth seals 62 and 64 with a vent therebetween. A seal 66 is also provided between the rotor 20 and the supporting bearings 52 and 54. This seal includes four shaft seal sections 68, 70, 72 and 74 which are shown to be labyrinth seals in the present embodiment. Between these seal sections, four annular cavities 76, 78, 80 and 82 are arranged to isolate the bearing 54 from the rotor 20. The first cavity 76 provides a vent to the high temperature fluid outlet 24 through a passageway 84. Next adjacent the vent 76 is a second vent 78 which accumulates additional fluid from the rotor 20 and air from the direction of the bearing 54. The air and fluid are exhausted through a passageway 86. Between this vent 78 and the bearings, an air pressure port 80 is supplied with pressurized air through line 88. In this way, an air barrier is created with gas that is pressurized to a level above the pressure of the adjoining segments. The vent 82 is most adjacent the bearing 54 and receives lubricant from the lubricant system 90 through the bearing 54 and air through the labyrinth seal 74 from the air port 80. The combined lubricant and air is then exhausted through an outlet 92 which may conveniently be controlled by a float valve for the lubricant and an orifice for the air.

Figure 3:
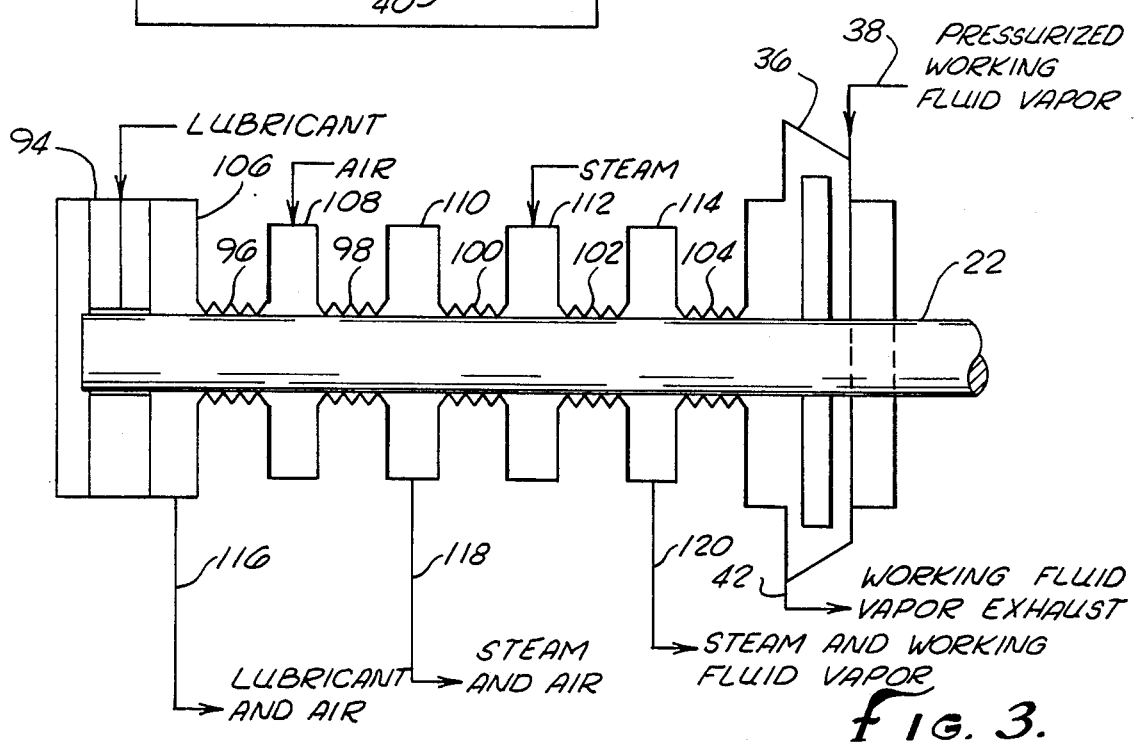
FIG. 3 is a schematic of a second seal mechanism which may be employed with the system of FIG. 1 assuming a different mounting arrangement for the shaft of the turbo-machinery.

An alternate arrangement is illustrated in FIG. 3 for the mounting of the shaft 22. Rather than employing a cantilevered arrangement, a lubricant bearing is provided on the other side of the rotor 36. To isolate the lubricated bearing 94 from the rotor 36 such that contaminant fluid from the rotor 36 will not reach the lubricant, a number of shaft seal sections 96 through 104 are employed in an alternating arrangement with annular cavities 106 through 114. Cavities 106, 110 and 114 are pressure vents designed to exhaust materials coming into the cavities through outlets 116, 118 and 120, respectively. In between labyrinth seals 96 and 98, the cavity 108 is supplied with pressurized air and thereby forms a pressure port to the shaft 22. Between labyrinth seals 100 and 102 is the annular cavity 112 which is pressurized by the high temperature fluid, in this preferred embodiment, steam. For this embodiment, it is understood that the fluid of the rotor 20 is less injurious to the lubricant found in the bearing 94 than is the fluid in the rotor 36. Thus, the higher temperature fluid forms a barrier to the flow of the lower temperature fluid and the air forms a barrier to both in order that the lubricant may be maintained in an uncontaminated state.

Thus, a number of process steps and the apparatus therefor are disclosed for the beneficial employment of a double fluid gas power system effecting isolation of the lubricated bearings and convenient separation of fluid components. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A double fluid power recovery system comprising a turbomachine including a rotor shaft, a first rotor fixed to said shaft and having a first inlet and a first outlet, and a second rotor fixed to said shaft and having a second inlet and a second outlet;
a first source of a first fluid in fluid communication with said first inlet, said first fluid having a first boiling point;
a second source of a second fluid in fluid communication with said second inlet, said second fluid having a second boiling point lower than said first boiling point; and
a heat exchanger in fluid communication with said first outlet, said second source and said second inlet.

2. The power recovery system of claim 1 further comprising a seal between said first and said second rotors including a first shaft seal section adjacent said first rotor, a second shaft seal section adjacent said second rotor and a pressure vent between said first and second shaft seal sections at a pressure below that at the rotor side of each said section.

3. The power recovery system of claim 2 further including a condenser in fluid communication with said pressure vent and having a first port for exhausting of said first fluid and a second port for exhausting of said second fluid, said first and said second fluid being immiscible.

4. The power recovery system of claim 3 wherein said condenser is in fluid communication with said second outlet and said first port is located on the bottom of said condenser.

5. The power recovery system of claim 3 wherein said condenser is in fluid communication with said first outlet and said second port is located at the top of said condenser for exhausting said second fluid as a vapor.

6. The power recovery system of claim 1, 2, 3, 4 or 5 wherein said first fluid is water and wherein said second fluid is a hydrocarbon.

7. A double fluid power recovery system, comprising
a turbomachine housing;
a shaft rotatably mounted in said housing;
a first rotor on said shaft through which a first fluid passes;
a second rotor on said shaft through which a second fluid passes;
a seal between said first and said second rotors including a first shaft seal section adjacent said first rotor, a second shaft seal section adjacent said second rotor and a pressure vent between said first and said second shaft seal sections at a pressure below that at the rotor side of each said section;
a condenser in fluid communication with said pressure vent and having a first port for exhausting of the first fluid and a second port for exhausting of the second fluid, the first and second fluids being immiscible.

8. The power recovery system of claim 7 wherein said condenser has a liquid collection cavity, said condenser being in fluid communication with said second rotor and said first port is located on the bottom of said liquid collection cavity.

9. The power recovery system of claim 7 wherein said condenser has a liquid collection cavity, said condenser being in fluid communication with said first rotor and said second port is located above the liquid level in said liquid collection cavity for exhausting the second fluid as a vapor.

10. A double fluid power recovery system for two immiscible fluids, comprising
a turbomachine housing:
a shaft rotatably mounted in said housing;
a first rotor on said shaft through which a first fluid passes;
a second rotor on said shaft through which a second fluid passes;
a first outlet from said first rotor;
a second outlet from said second rotor;
a seal between said first and said second rotors including a first shaft seal section adjacent said first rotor and a second shaft seal section adjacent said second rotor and a pressure vent between said first and said second shaft seal sections at a pressure below that at the rotor side of each said section;
a first condenser having a first liquid collection cavity, said first condenser being in fluid communication with said first outlet;
a second condenser having a second liquid collection cavity, said second condenser being in fluid communication with said second outlet and said pressure vent;
a first port being in fluid communication with said first liquid collection cavity above the liquid level thereof and with said second condenser; and
a second port in fluid communication with said second liquid collection cavity at the bottom thereof, said first and said second rotors being constructed and arranged for said first rotor to handle fluid of a higher specific gravity than said second rotor, the fluids being immiscible.

11. The power recovery system of claim 10 further including a fluid source of the lower specific gravity fluid and an inlet to said second rotor, said fluid source including a heat exchanger having first and second fluid passageways in thermal communication, said first fluid passageway being in fluid communication with said first outlet and said second fluid passageway being in communication with said inlet, said first condenser being in fluid communication with said first rotor through said first fluid passageway, said first and said second rotors being constructed and arranged for the first fluid to said first rotor having a higher boiling point than to said second rotor.

12. A seal for a turbomachine rotor for working fluid which is a lubricant solvent, comprising in seriatum
a first shaft seal section, adjacent the rotor;
a first pressure vent;
a second shaft seal section;
a first pressure port;
a third shaft seal section;
a second pressure vent;
a fourth shaft seal section;
a second pressure port;
a fifth shaft seal section; and
further comprising not in seriatum a source of pressurized steam in fluid communication with said first pressure port; and
a source of pressurized air in fluid communication with said second pressurized port.

13. The seal of claim 12 further including a lubricated bearing adjacent said fifth shaft seal section.

14. A double fluid power recovery system comprising
a turbomachine including a rotor shaft, a first rotor fixed to said shaft having a first inlet and a first outlet, and a second rotor fixed to said shaft and having a second inlet and a second outlet;
a first source of a first fluid in fluid communication with said first inlet, said first fluid having a first boiling point;
a second source of a second fluid in fluid communication with said second inlet, said second fluid having a second boiling point lower than said first boiling point;
a seal for said rotor shaft positioned adjacent said second rotor, said second rotor being between said shaft seal and said first rotor, said seal including in seriatum a first shaft seal section adjacent said second rotor, a first pressure vent, a second shaft seal section, a first pressure port, a third shaft seal section, a second pressure vent, a fourth shaft seal section, a second pressure port, and a fifth shaft seal section, said first pressure port being in fluid communication with said first source; and
a source of pressurized gas in fluid communication with said second pressurized port.

15. The power recovery system of claim 14 further comprising a lubricated bearing adjacent said fifth shaft seal section.

16. The power recovery system of claim 1, 7, 10 or 14 further including a first lubricated bearing rotatably mounting said shaft, said first rotor being between said first lubricated bearing and said second rotor, said first and second rotors being cantilevered on said shaft from said first lubricated bearing.

17. A process for recovering power from a heat source, comprising the steps of
   expanding a first fluid through a first rotor of a turbine;
   condensing the first fluid through thermal contact with a second fluid having a lower boiling point than the first fluid;
   expanding the second fluid through a second rotor of the turbine.

18. The process of claim 17 further comprising the steps of
   accumulating the condensed first fluid;
   condensing the expanded second fluid;
   accumulating the condensed second fluid;
   venting a seal between the rotors to the expanded second fluid;
   separating the first fluid vented from the seal after accumulating the second fluid.

19. A process for sealing a shaft between the rotor of a turbine and a supporting lubricated bearing, comprising the steps of
   introducing pressurized steam to the shaft between the rotor and the bearing at a first position;
   venting the shaft on either side of the first position;
   introducing pressurized air at a second position between the bearing and the venting of the shaft adjacent the first position;
   venting the shaft between the bearing and the second position.

* * * * *